(12) United States Patent
Arendt et al.

(10) Patent No.: US 10,214,628 B2
(45) Date of Patent: *Feb. 26, 2019

(54) PLASTICIZER BLENDS AND PLASTISOL COMPOSITIONS COMPRISED THEREOF

(71) Applicant: EMERALD KALAMA CHEMICAL, LLC, Kalama, WA (US)

(72) Inventors: William D. Arendt, Libertyville, IL (US); Emily McBride, Kalama, WA (US); Rebecca Hanes, Woodland, WA (US)

(73) Assignee: Emerald Kalama Chemical, LLC, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,347

(22) PCT Filed: Mar. 14, 2014

(86) PCT No.: PCT/US2014/028071
§ 371 (c)(1),
(2) Date: Aug. 28, 2015

(87) PCT Pub. No.: WO2014/143902
PCT Pub. Date: Sep. 18, 2014

(65) Prior Publication Data
US 2016/0017119 A1     Jan. 21, 2016

Related U.S. Application Data

(60) Provisional application No. 61/788,555, filed on Mar. 15, 2013.

(51) Int. Cl.
*C08K 5/103* (2006.01)
*C08K 5/101* (2006.01)
*C08J 3/18* (2006.01)

(52) U.S. Cl.
CPC ............. *C08K 5/103* (2013.01); *C08J 3/18* (2013.01); *C08K 5/101* (2013.01); *C08J 2300/00* (2013.01); *C08K 2201/014* (2013.01)

(58) Field of Classification Search
CPC ........................................... C08K 5/103
See application file for complete search history.

(56) References Cited

U.S. PATENT DOCUMENTS

| | | | |
|---|---|---|---|
| 5,319,028 A | 6/1994 | Nakamura et al. | |
| 5,349,049 A * | 9/1994 | Nishina | C08F 6/24 528/485 |
| 8,034,860 B2 | 10/2011 | Arendt et al. | |
| 9,193,843 B2 * | 11/2015 | Arendt | C08K 5/12 |
| 2005/0137030 A1 | 6/2005 | Sullivan | |
| 2008/0021141 A1 | 1/2008 | Arendt et al. | |

FOREIGN PATENT DOCUMENTS

WO     2012/092366 A1     7/2012

* cited by examiner

*Primary Examiner* — Michael F Pepitone
(74) *Attorney, Agent, or Firm* — Hudak, Shunk & Farine Co. LPA

(57) ABSTRACT

A novel plasticizer blend(s) useful for plastisol compositions, including organisols, having good solvating properties, good viscosity profiles and compatibility with other plasticizers and solvents traditionally used in plastisols, comprising benzoate ester plasticizer(s) and a compatibilizing plasticizer component. Methods for preparing a plastisol having low viscosity and good rheology characteristics and for rendering a benzoate ester plasticizer, or blends thereof, compatible with organic solvents traditionally used in plastisols, by incorporating the novel plasticizer blend(s), which do not require adjusting the solubility parameters of the solvents to accommodate the plasticizer, are disclosed.

7 Claims, 10 Drawing Sheets

PLASTICIZER BLENDS AND PLASTISOL COMPOSITIONS COMPRISED THEREOF

CROSS-REFERENCE TO RELATED APPLICATIONS

This application is a 371 of International Application PCT/US2014/028071 filed Mar. 14, 2014, which claims the priority filing date of U.S. Provisional Application Ser. No. 61/788,555 filed Mar. 15, 2013, herein fully incorporated by reference.

FIELD OF THE INVENTION

This invention is directed to a novel plasticizer blend useful for plastisol compositions, including organisols. The novel blend(s) have good solvating properties, good viscosity profiles and are highly compatible with other plasticizers and solvents traditionally used in plastisols. The invention is also directed to plastisols comprising the novel plasticizer blend and a method for compatibilizing the plasticizer and solvent components of a plastisol composition to render them more workable.

BACKGROUND OF THE INVENTION

Typically, a "plastisol" means a liquid polymer composition comprising a particulate form of at least one non-crosslinked organic polymer dispersed in a liquid phase comprising a plasticizer for the polymer. Plastisols also include "organisols", which are plastisols in which solvents, such as liquid hydrocarbons, ketones, or other organic liquids, are used in amounts greater than about 5 wt. %, in addition to plasticizers, to control viscosity and other properties of the plastisol. Plastisols are used in a variety of applications, including without limitation flooring, screen inks, films, coatings, and molding and casting compounds.

Plastisols, by definition, are dispersions of polyvinyl chloride (PVC) and PVC copolymers. Acrylic-based plastisols are also common.

There are a large variety of plasticizers that have found use in plastisols. A typical plasticizer is defined as an organic liquid that will soften a polymer and make it more workable, as long as the polymer and plasticizer are at least partially compatible. Plasticizers are used to adjust hardness (or softness) of a polymer, impart stain resistance, alter tensile properties (such as strength, elongation or flexibility) and facilitate processability, as required, for a multitude of applications, including without limitation flexible vinyl applications. Plasticizers also serve as a vehicle for the dispersion of resin (polymer) particles, such as PVC.

Plasticizers are available in a wide variety of alternative chemistries and include: 1) general purpose, 2) specialty types and 3) secondary and diluent types, more fully described herein. A key distinction between plasticizers is their ability to solvate dispersed solid polymers and/or their gelation and fusion temperatures in plastisols. Gelation and fusion temperatures dictate the speed of production and are influenced by the solvating power of the plasticizer. By way of example only, the gelation and fusion temperatures of a plastisol containing a dibenzoate plasticizer will be lower than a plastisol containing a general purpose plasticizer, thus enabling speed of processing in that particular application.

General purpose plasticizers provide an excellent compromise between performance characteristics and economy for most applications. Some examples include: bis (2-ethylhexyl phthalate) (DEHP or DOP), diisononyl phthalate (DINP), dioctyl phthalate (DnOP), diisodecyl phthalate (DIDP), dipropylheptyl phthalate (DPHP), di-2-ethylhexyl terephthalate (DOTP or DEHT), and diisononyl-1,2 cyclohexane dicarboxylate (DIDC, or BASF's Hexamoll™ DINCH®).

Specialty type plasticizers were developed, in part, to fulfill the need for high solvators, the most popular historically being lower molecular weight phthalates. Examples include butyl benzyl phthalate (BBP), di-n-butyl phthalate (DBP) and diisobutyl phthalate (DIBP). Examples of non-phthalate, high solvating plasticizers include benzoate esters, some citric acid esters, alkyl sulfonic acid esters, and certain phosphates. Dibutyl terephthalate (DBTP) and n-alkyl pyrrolidones have also been proposed as specialty type, high solvating plasticizers.

Benzoate ester plasticizers include dibenzoates and monobenzoates. Useful dibenzoates include diethylene glycol dibenzoate (DEGDB), dipropylene glycol dibenzoate (DPGDB), triethylene glycol dibenzoate (TEGDB), 1,2-propylene glycol dibenzoate (PGDB), and blends thereof. Monobenzoate esters known to be useful as plasticizers include: isodecyl benzoate, isononyl benzoate, and 2-ethylhexyl benzoate. Benzoate ester plasticizers, alone and in combination, have a broad range of compatibilities with polymers utilized in the plastisol industry and possess good solvating and rheology characteristics that compare favorably to traditional high solvating phthalates.

Examples of secondary and diluent type plasticizers, used primarily to reduce plastisol viscosity, include those based on castor oil and soybean oil. Isodecyl benzoate, a monobenzoate, is also a useful diluent type plasticizer.

All of the high solvator plasticizers discussed above (regardless of type) add value to vinyl compositions that traditional general purpose plasticizers cannot. Traditional general purpose plasticizers have good rheology profiles, but have poor solvating ability.

While solvating characteristics are important, most high solvating plasticizers are limited in their usefulness due to high plastisol viscosity or poor plastisol rheology characteristics. An ideal plasticizer possesses a good balance between the solvation and rheology characteristics they impart. In many applications, particularly plastisols, high solvating plasticizers require the use of organic solvents to reduce viscosity for processability. Useful solvents include liquid hydrocarbons, ketones, and other organic liquids. An example of a useful solvent is Santicizer® 375, a mixture of $C_{10}$-$C_{16}$ alkyl benzenes and normal low molecular weight paraffins (~20%).

The use of diluents to minimize the viscosity of a plastisol is known in the art. U.S. Pat. No. 8,034,860 to Arendt et al. describes a plastisol comprising an organic polymer, a plasticizer and an organic liquid and a method for preparing the plastisol that predictably yields low viscosity. Arendt et al. describe past trial and error practices of selecting suitable diluent/plasticizer combinations to maintain low viscosity. Arendt et al. discovered that when replacing a phthalate (BBP) plasticizer with the dibenzoates of DEG and DPG, a 25-fold increase in plastisol viscosity resulted, which was too viscous for processing. The viscosity could not be reduced to a processable level using a common liquid hydrocarbon mixture (63 wt. % aromatic hydrocarbons, 15 wt. % mixed aliphatic hydrocarbons and 22 wt. % normal paraffinic hydrocarbons) traditionally used with plastisols that contain BBP as the plasticizer. Arendt et al. resolved the problem by using an additional solvent that would meet a specified Hildebrand solubility relationship.

In particular, Arendt et al. discovered that the viscosity of a plastisol is directly related to a previously unknown mathematical relationship between the Hildebrand solubility parameter of the polymer and the weight average of the Hildebrand solubility parameters of the organic diluent(s), plasticizer and any other liquid ingredients present in the plastisol. The solution to the problem of higher viscosity was resolved by Arendt et al. by selecting solvent components based upon their Hildebrand solubility parameters. Specifically, selection of a proper type and amount of diluent (solvent) uses a mathematical relationship between: a) the Hildebrand solubility parameter of the polymer portion and b) a weighted average of the Hildebrand solubility parameter values of all liquid ingredients of the plastisol. The differences between a) and b) must be within specified limits (±0.6 to about ±1.0) to minimize plastisol viscosity and/or avoid the possibility of exudation of liquids from articles formed by the plastisol.

Compatibility between the polymer and plasticizer are important to performance of the plastisol. For the plasticizer to function, it must be at least partially compatible with the polymer. Use of solvents to minimize viscosity may result in incompatibility as well, when the primary plasticizer is not compatible with the solvent.

A novel method for minimizing the viscosity of a plastisol, while maintaining compatibility among the components, has been developed that does not require adjusting the solubility parameters of the plastisol components, in particular the solvents, to accommodate the plasticizer, nor selecting solvents purely on the basis of solubility parameters. Rather, the novel method adjusts the plasticizer composition to accommodate the traditional solvents used in plastisols, but does not require maintaining strict limits for the difference (±0.6-±1) between the Hildebrand solubility parameters of the dispersed polymer and that of the liquid phase components. In particular, it has been discovered that dibenzoate blends of plasticizers can be modified using either PGDB or dioctyl succinate (DOSx) to change their solubility parameters sufficiently to achieve compatibility with hydrocarbon liquid mixtures (solvents) traditionally used in plastisols. DOSx has not heretofore been used in the flooring industry. The inventive method has particular utility in the flooring industry, but the invention is not limited as such. The method may be utilized with plastisols for a variety of applications.

The method utilizes a novel plasticizer blend that does not require any alteration in the selected organic solvent. The blend comprises, in one embodiment, a compatibilizing plasticizer component, dioctyl succinate, which is completely compatible with high solvating plasticizers, such as the benzoate esters, and renders the benzoate plasticizer compatible with the organic solvent. In other embodiments, the novel blend comprises 1,2-propylene glycol dibenzoate (PGDB), 3-phenyl propyl benzoate (3-PPB), or other compatibilizing plasticizer components, all of which are also completely compatible with high solvating benzoate ester plasticizers, in amounts sufficient to render the benzoate ester plasticizers compatible with the organic solvent.

The novel methodology and blend(s) are based upon the changing of the polarity of the plasticizer system, which results in unexpectedly reduced viscosity of the plastisol, even in systems where components have previously been regarded as incompatible. The novel blend results in better viscosity and fusion points through the addition of a plasticizer component. The novel method does not require changing the organic solvents traditionally used in plastisols.

It is an object of the invention to provide a novel plasticizer blend for use in plastisols, which is compatible with a wide variety of organic solvents.

It is a further object of the invention to provide a plastisol composition comprising the novel plasticizer blend.

It is yet another object of the invention to provide a method of maintaining compatibility between a plasticizer(s) and an organic diluent in a plastisol composition.

Still a further object of the invention is to provide a liquid phase in which to disperse a polymer, comprising a plasticizer(s) and an organic diluent, wherein the plasticizer is completely compatible with the organic diluent mixture.

SUMMARY OF THE INVENTION

In one embodiment, the invention is directed to a novel plasticizer blend comprising: a benzoate ester plasticizer, or blends thereof, as a primary plasticizer, and a sufficient amount of a compatibilizing plasticizer component, to render the benzoate ester plasticizer compatible with an organic solvent traditionally used in plastisols.

In a second embodiment, the invention is directed to a novel plasticizer blend comprising: a benzoate ester plasticizer, or blends thereof, as a primary plasticizer, and a sufficient amount of dioctyl succinate (DOSx) to render the benzoate ester plasticizer compatible with an organic solvent.

In a third embodiment, the invention is directed to a novel plasticizer blend comprising: a benzoate ester plasticizer, or blends thereof, as a primary plasticizer and a sufficient amount of 1,2-propylene glycol dibenzoate (PGDB) to render the benzoate ester plasticizer compatible with an organic solvent.

In a fourth embodiment, the invention is directed to a novel plasticizer blend comprising: a benzoate ester plasticizer, or blends thereof, as a primary plasticizer and a sufficient amount of 3-phenyl propyl benzoate (3-PPB) to render the benzoate ester plasticizer compatible with an organic solvent.

A fifth embodiment of the invention is a liquid blend for dispersing a polymer comprising: the novel plasticizer blend and an organic diluent.

In a sixth embodiment, the invention is a plastisol comprising: an organic polymer and a liquid phase comprising the novel plasticizer blend and an organic solvent (diluent).

In a seventh embodiment, the invention is a method for preparing a plastisol having low viscosity and good rheology characteristics comprising: adding the novel plasticizer blend to an organic liquid and dispersing a polymer therein.

In yet another embodiment, the invention is directed to a method for rendering a benzoate ester plasticizer, or blends thereof, compatible with an organic solvent liquid or other plasticizers, by adding a sufficient amount of DOSx, PGDB, or 3-PPB, or other compatibilizing plasticizer components, while maintaining good solvating and rheology characteristics.

DETAILED DESCRIPTION OF THE INVENTION

Figure 1:
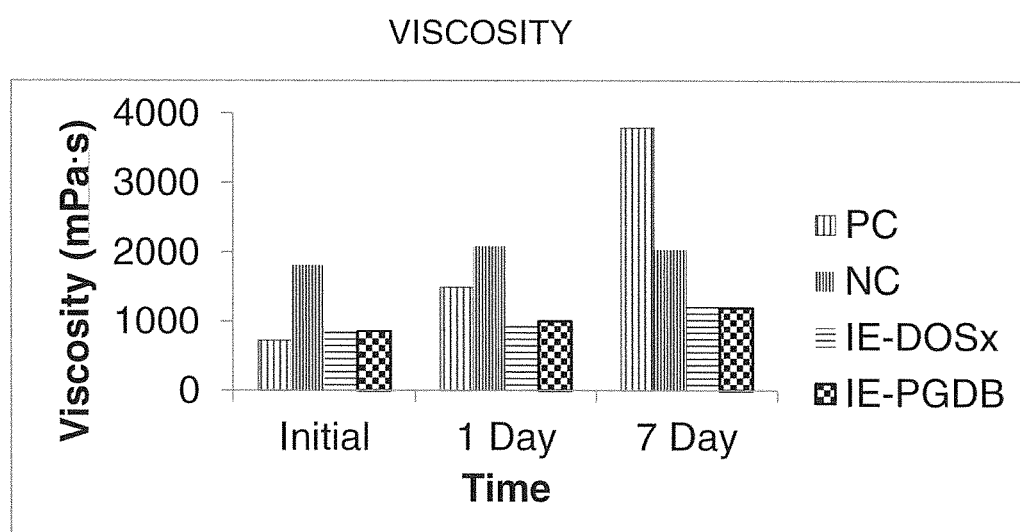
FIG. 1 shows low shear viscosity results of various wear layer formulations.

The present invention is based on the discovery that known, incompatible mixtures of benzoate ester plasticizer(s) and organic liquids (solvents) may be rendered compatible by the addition of a compatibilizing plasticizer component to the primary plasticizer, while maintaining good solvating and rheology characteristics.

The present invention is directed to a novel blend of plasticizers that is compatible with a wide variety of polymers, as well as organic diluents traditionally used to lower plastisol viscosity. The novel plasticizer blend comprises benzoate ester plasticizer(s) in combination with a compatibilizing plasticizer component that is compatible with high solvating benzoate plasticizers and capable of rendering them compatible with traditional solvents used in plastisols. Particularly useful compatibilizing plasticizer components include: dioctyl succinate (DOSx), 1,2-propylene glycol dibenzoate (PGDB), 3-phenyl propyl benzoate, or mixtures thereof, although the invention is not limited as such.

The invention is also directed to a liquid dispersant for polymers comprising the novel plasticizer blend and an organic diluent (solvent). The invention is also directed to a method of rendering the liquid phase components of a plastisol compatible with each other, i.e., compatibilizing the plasticizer/solvent combination to avoid increases in viscosity.

The novel plasticizer blends of the present invention are useful for a variety of plastisol applications. The invention is particularly useful in the flooring industry, but the invention is not limited as such.

In the past, benzoate ester plasticizers have been known to be high solvators with poor rheology characteristics. For many applications, organic diluents (solvents) are required to lower viscosity of the resulting plastisol so that it may be processed using conventional equipment. It is known that the benzoate esters are incompatible with some traditional organic diluents used for viscosity lowering. The novel plasticizer blend of the present invention provides good compatibility between the plasticizer and the organic solvent without the need to change solvents or alter formulations based on the solubility parameters of the components or any mathematical relationships relating to solubility parameters.

The preferred embodiment of the invention is a blend of benzoate ester plasticizers with DOSx, PGDB, or 3-PPB as a compatibilizing plasticizer. The present invention is not restricted to any particular dibenzoate ester plasticizer or blends thereof, compatibilizing plasticizers, or polymers, although the invention may be described in terms of particular components in the examples.

The inventive plasticizer blend can generally be utilized with different polymeric dispersions. By way of non-limiting examples, the inventive plasticizer blend may be used to prepare a reduced viscosity PVC, PVC copolymer or acrylic-based plastisol in accordance with the present invention.

Suitable acrylic polymer compositions useful in the present invention include various polyalkyl methacrylates, such as methyl methacrylate, ethyl methacrylate, butyl methacrylate, cyclohexyl methacrylate, or allyl methacrylate; or various aromatic methacrylates, such as benzyl methacrylate; or various alkyl acrylates, such as methyl acrylate, ethyl acrylate, butyl acrylate, or 2-ethylhexyl acrylate; or various acrylic acids, such as methacrylic acid and styrenated acrylics.

Other polymers for which the inventive plasticizer blend may be useful will be evident to one skilled in the art.

For purposes of the invention, "plastisol" means a liquid polymer composition comprising a particulate form of at least one non-crosslinked organic polymer dispersed in a liquid phase comprising a plasticizer for the polymer. As used in the invention, "plastisol" also means and includes an "organisol" that is a plastisol in which solvents, such as liquid hydrocarbons, ketones, or other organic liquids, are used in amounts greater than about 5 wt. % to control viscosity and other properties of a plastisol.

As used herein, "high solvator" or "high solvating" is a term that describes the plasticizer's efficiency in penetrating, thickening, and gelling a plastisol before full physical properties are developed. "High solvating" means that all of the plasticizer is absorbed into the PVC (or other polymer) of a plastisol at lower temperatures than that for general purpose plasticizers, thus facilitating a faster formation of a homogenous phase.

As used herein, "organic diluent", "organic solvent", "organic liquid", "solvent" and "hydrocarbon liquids" are interchangeable.

As used herein, "benzoate plasticizer" and "benzoate ester plasticizer" are interchangeable.

Dibenzoate plasticizers useful in the novel plasticizer blend of the invention include but are not limited to: DEGDB, DPGDB, TEGDB, PGDB and blends thereof. Other benzoate ester plasticizers, including the monobenzoates, may be useful in the claimed invention, including 2-ethyl hexyl benzoate (EHB), isononyl benzoate (INB), 3-phenyl propyl benzoate (3-PPB) and isodecyl benzoate (IDB).

Compatibilizing plasticizer component(s) useful in the present invention include but are not limited to: dioctyl succinate (DOSx), PGDB, 3-PPB, or combinations thereof. Other compatibilizing plasticizer components that are compatible with high solvating benzoate plasticizers are known to one skilled in the art. The characteristic of useful compatibilizing plasticizer components is that it must be capable of rendering high solvating dibenzoate plasticizer systems compatible with traditional solvents used in plastisols, as contemplated by the invention.

The compatibilizing plasticizer component is added to the plasticizer in amounts ranging from about 5 wt. % to about 70 wt. %, based upon the total plasticizer content. Amounts lower or higher than the stated range are within the scope of the invention, because amounts of the compatibilizing plasticizer useful in the invention also depend on the amount of organic solvent being utilized. Higher solvent amounts require more compatibilizing plasticizer than lower solvent amounts.

The total amount of plasticizers used in any particular polymeric dispersion would range broadly depending on the particular polymer, the characteristics of the polymer and other components, the process, the application or use and the results desired. Generally, the total amount of plasticizers ranges from about 1 to about 300, desirably from about 10 to about 100, and preferably from about 20 to about 80 phr for one or more thermoplastic, thermoset, or elastomeric polymers, including without limitation those identified above. A particularly preferred embodiment is a plastisol comprising from about 30 to about 120 phr total plasticizer content.

Organic diluents useful in plastisols include liquid hydrocarbon mixtures, ketones, and other organic liquids. A traditional organic diluent comprises a mixture of $C_{10}$-$C_{16}$ alkyl benzenes with about 20% normal low molecular weight paraffins available commercially as Santicizer® 375 (Ferro Corp.), among others. Other organic diluents useful in plastisols include solvents such as mineral spirits, cycloaliphatic or other petroleum distillates, detergent alkylates or isoparaffins and the like. Organic diluents are used in plastisols in wide ranging amounts. Plastisols that contain a total of more than about 5 wt. % liquid diluent, in addition to the amount of the required plasticizers, are referred to as organisols.

The novel plasticizer blend may be pre-mixed prior to adding to a plastisol or organic diluent, or the compatibilizing plasticizer component may be post-added to a blend of the benzoate ester plasticizer and organic liquid. Adding the compatibilizing plasticizer component to a blend of the benzoate plasticizer and organic liquid may require less of the compatibilizing component than if the plasticizer blend is pre-mixed.

Useful amounts for the components of the novel plasticizer blend are included in the examples. It is expected that one skilled in the art would be able to arrive at additional acceptable amounts based on the intended use and desired performance in the particular polymeric application.

Plastisols of the present invention may also include, in addition to the plasticizer and organic diluent, conventional additives, such as oils, antioxidants, surfactants, heat stabilizers, flame retardants, surfactants, blending resins, fillers, waxes, other solvents and the like, depending on the particular application or polymeric dispersion. Additive amounts can generally vary widely and often range from about 0.1 to about 75 parts by weight for every 100 parts by weight of the plastisol composition.

There are a large variety of uses for the plastisols of the invention, including but not limited to resilient flooring, wear layers, wall coverings, toys, gloves, and leather and textile applications. Other uses will be known and evident to one skilled in the art based upon the description of the invention herein.

The invention is further described by the examples set forth herein.

EXAMPLES

It was discovered that dibenzoates were not compatible nor miscible with Santicizer® 375 (S-375), a traditional liquid hydrocarbon diluent used for plastisols to lower viscosity, comprising a mixture of $C_{10}$-$C_{16}$ alkyl benzenes and about 20% normal low molecular weight paraffins. Unexpectedly, a simple addition of dioctyl succinate (DOSx) rendered the dibenzoates completely compatible with the S-375. In addition, it was discovered that blending sufficient amounts of a dibenzoate, 1,2-propylene glycol dibenzoate (PGDB) with other dibenzoate esters previously known to be incompatible with the solvent, unexpectedly rendered the entire dibenzoate blend compatible with the solvent.

The following plasticizer and solvent components were utilized in the examples:
K-Flex® 975 P (975 P)—a dibenzoate triblend (20 wt. % 1,2-propylene glycol dibenzoate (PGDB) with 80 wt. % of a 4:1 DEGDB/DPGDB diblend)
K-Flex® 850 P (850 P)—a dibenzoate diblend (4:1 DEGDB:DPGDB)
K-Flex® PG—1,2-propylene glycol dibenzoate (PGDB)
X-613—3-phenyl propyl benzoate (3-PPB)
Santicizer® 375 (S-375)—liquid organic diluent comprising a mixture of $C_{10}$-$C_{16}$ alkyl benzenes and ~20% normal low molecular weight paraffins

Example 1

DOSx Liquid Component Experiments.

The first example evaluated K-Flex® 975 P (dibenzoate triblend) and DOSx in different ratios with the organic diluent. The plasticizer components were mixed first, then the S-375 was added. The mixture was shaken again, and the compatibility, based upon clarity and phase separation or homogeneity, was recorded on a 0-10 scale, with 0 being completely incompatible (separate phases), and 10 being completely compatible (clear homogeneous liquid). The results are shown below in Table 1.

TABLE 1

| Run | 975 P (g) | DOSx (g) | S-375 (g) | Compatible (0-10) |
|---|---|---|---|---|
| 1 | 24.09 | 2.31 | 3.6 | 10 |
| 2 | 25.08 | 1.32 | 3.6 | 10 |
| 3 | 23.76 | 2.64 | 3.6 | 10 |
| 4 | 21.12 | 5.28 | 3.6 | 10 |
| 5 | 25.08 | 1.32 | 3.6 | 9—slow |
| 6 | 22.44 | 3.96 | 3.6 | 10 |
| 7 | 23.1 | 3.3 | 3.6 | 10 |
| 8 | 25.08 | 1.32 | 3.6 | 9—slow |
| 9 | 21.12 | 5.28 | 3.6 | 10 |
| 10 | 22.11 | 4.29 | 3.6 | 10 |
| 11 | 21.12 | 5.28 | 3.6 | 10 |

The K-Flex® 975 P was then replaced with K-Flex® 850 P (dibenzoate diblend), and the experiment was performed again. The results are shown in Table 2.

TABLE 2

| Run | 850 P (g) | DOSx (g) | S-375 (g) | Compatible (0-10) |
|---|---|---|---|---|
| 1 | 24.09 | 2.31 | 3.6 | 10 |
| 2 | 25.08 | 1.32 | 3.6 | 9—slow |
| 3 | 23.76 | 2.64 | 3.6 | 10 |
| 4 | 21.12 | 5.28 | 3.6 | 10 |
| 5 | 25.08 | 1.32 | 3.6 | 9—slow |
| 6 | 22.44 | 3.96 | 3.6 | 10 |
| 7 | 23.1 | 3.3 | 3.6 | 10 |
| 8 | 25.08 | 1.32 | 3.6 | 9—slow |
| 9 | 21.12 | 5.28 | 3.6 | 10 |
| 10 | 22.11 | 4.29 | 3.6 | 10 |
| 11 | 21.12 | 5.28 | 3.6 | 10 |

Based on these two experiments, it was concluded that about 8.7% of DOSx, based on the total weight of the plasticizer components, was needed to achieve complete compatibility of the K-Flex® 975 P (dibenzoate triblend) or K-Flex® 850 P (dibenzoate diblend) with S-375.

Example 2

PGDB & DOSx Liquid Component Experiments.

The experiment was changed to include varying ratios of K-Flex® PG (PGDB) in the plasticizer system. This evaluation allowed for formulations where DOSx was completely removed from the mixture, and the compatibility of the mixture of K-Flex® PG and K-Flex® 850 P was determined with S-375. The results are shown below in Table 3.

TABLE 3

| Run | 850 P (g) | PG (g) | DOS (g) | S-375 (g) | Compatible (0-10) |
|---|---|---|---|---|---|
| 1 | 13.34 | 3.34 | 3.34 | 5 | 10 |
| 2 | 0 | 20 | 0 | 5 | 10 |
| 3 | 3.34 | 13.34 | 3.34 | 5 | 10 |
| 4 | 0 | 0 | 20 | 5 | 10 |
| 5 | 20 | 0 | 0 | 5 | 0 |
| 6 | 10 | 0 | 10 | 5 | 10 |
| 7 | 6.66 | 6.66 | 6.66 | 5 | 10 |
| 8 | 0 | 20 | 0 | 5 | 10 |
| 9 | 10 | 10 | 0 | 5 | 0 |
| 10 | 20 | 0 | 0 | 5 | 0 |
| 11 | 10 | 10 | 0 | 5 | 0 |
| 12 | 0 | 10 | 10 | 5 | 10 |
| 13 | 0 | 0 | 20 | 5 | 10 |
| 14 | 3.34 | 3.34 | 13.34 | 5 | 10 |

This experiment showed that PG and DOSx, alone, are compatible with S-375. These results show that there are more opportunities to vary the amount of PG used in dibenzoate plasticizer mixtures to facilitate solubility and compatibility in a plastisol composition, which would have been otherwise closed to dibenzoate plasticizers.

Example 3

PGDB Liquid Component Experiment.

Another experiment was performed to determine how much K-Flex® PG was needed to achieve complete compatibility between the K-Flex® 850 P (dibenzoate diblend) and the S-375. The results are shown below in Table 4.

TABLE 4

| Run | 80 P (g) | PG (g) | S-375 (g) | Compatible (0-10) |
|---|---|---|---|---|
| 1 | 10 | 10 | 10 | 0 |
| 2 | 8 | 12 | 10 | 8—some gradient lines |
| 3 | 6 | 14 | 10 | 10 |

The results suggested that a higher percentage of the compatibilizing plasticizer, PGDB, is needed in the inventive plasticizer blends, than is required for DOSx, to achieve complete compatibility. However, this may not be the case, because the percentage (%) of S-375 in each of the tested blends varied (from 12% in the original DOSx testing (Example 1) to 30% in the PGDB testing above in Table 4). With less solvent (S-375) in the PGDB testing, less PGDB would be required to compatibilize the system. Regardless, the results showed that by varying the ratios of dibenzoate plasticizers, complete compatibility with the organic diluent may be achieved, without altering the solvent.

Example 4

3-PPB Liquid Component Experiments.

This experiment evaluated the compatibility of X-613 (3-PPB, a monobenzoate) with S-375, an organic diluent used in the flooring industry that is not typically compatible with most dibenzoates. Because the X-613 monobenzoate is useful in plastisols as a viscosity reducer, compatibility with S-375 was considered important.

A simple one-to-one mixture of X-613 and S-375 was combined in a vial and hand shaken. The mixture cleared right away, indicating complete compatibility of the two components. Following this discovery, blends of X-613 with K-Flex® 850 P (dibenzoate diblend) were prepared to determine the minimum amount of X-613 necessary to compatibilize K-Flex® 850 P with S-375. The use of X-613 in a blend with K-Flex® 850 P would be useful as X-613 should help to reduce viscosity in plastisols. Table 5 shows the results of the premixed benzoate blend testing; 0 indicates a cloudy/emulsified mixture, 10 indicates a clear mixture (compatible).

TABLE 5

Minimum level of X-613 in a premixed blend with 850 P to have compatibility with S-375 (present at an additional ~30%).

| X-613 | 850 P | Clarity |
|---|---|---|
| 16.7% | 83.3% | 0 |
| 20.0% | 80.0% | 0 |
| 23.1% | 76.9% | 10 |

As shown in Table 5, the minimum amount of X-613 necessary in a blend of K-Flex® 850 P to allow complete compatibility with S-375 was approximately 23%.

Additional testing was performed to determine what amount of X-613 would be necessary to compatibilize K-Flex® 975 P (dibenzoate triblend) with S-375. It was expected that it would require less X-613, as K-Flex® PG is completely compatible with S-375 and is present in K-Flex® 975 P at 20 wt. %. Table 6 sets forth the amount of X-613 determined to be necessary in a premixed benzoate blend to achieve compatibility with S-375.

TABLE 6

Minimum level of X-613 in a premixed blend with 975 P to have compatibility with S-375 (present at an additional ~30%).

| X-613 | 975 P | Clarity |
|---|---|---|
| 9.1% | 90.9% | 0 |
| 14.5% | 85.5% | 0 |
| 16.7% | 83.3% | 10 |

As shown in Table 6, for complete compatibility with S-375, the minimum amount of X-613 in a blend with K-Flex® 975 P is approximately 17%.

During testing, it was discovered that premixing the primary dibenzoate plasticizers with the compatibilizing plasticizer component, versus post-adding the compatibilizing plasticizer component to a blend of the solvent and primary plasticizer, made a difference in the amount necessary to achieve compatibility. Typically, when post-adding the compatibilizing component to a blend of S-375 and incompatible dibenzoate(s), less of the compatibilizing plasticizer component was needed. Therefore, the harsher and more relevant test involves premixing the benzoates before adding the S-375.

Example 5

Liquid Component Compatibility Testing.

Several neat liquid compatibility tests were run in order to determine the proper ratios of liquid raw materials used in a typical S-375 wear layer formulation. Each component was weighed into a vial; the vial was shaken and observed for clarity. When the liquid components came out clear or somewhat cloudy when shaken together for a given formulation, it was found that the viscosity of that formulation was low once it was prepared. When the liquid components were very cloudy and separated after resting, the prepared formulation had a high viscosity due to the incompatibility of the liquids in the system.

The following components were evaluated: BBP, K-Flex® 850 P (dibenzoate diblend), DOSx, S-375, TXIB (trimethyl pentanyl diisobutyrate), Viscobyk® 4040 (low volatility viscosity depressant for plastisols), and Mark® 1221 (Ca/Zn organic stabilizer for plastisols).

Table 7, below, outlines the neat liquid compatibility observations determined on several iterations of the wear layer formulation. The end result was that TXIB was removed from the formulation as it was found to be playing the same role as PGDB or DOSx does in rendering the liquids in the system compatible.

Brookfield Viscosity Method:

The Brookfield viscosity was tested using a RVDVII+ Pro Viscometer. A 30 second reading at 20 RPMs was taken; temperature was 23±1° C.

Formulations:

Dry ingredients were mixed into liquid ingredients at 500 RPM; speed was increased to 750 RPM and mixed for 10 minutes. A water bath was utilized when necessary to keep the plastisol from overheating during mixing (kept temperature under 30° C.). Plastisols were degassed thoroughly prior to testing.

Wear Layer Formulations.

The four wear layer formulations that were evaluated are shown in Table 8, below. The controls included a positive control (PC), comprising BBP, which demonstrated typical expected performance, and a negative control (NC), replacing BBP with K-Flex® 850P, a dibenzoate diblend, which demonstrated higher viscosities consistent with an incompatibility between the raw materials of the formulation. The inventive examples are designated as "IE".

TABLE 7

Neat Liquid Compatibility Observations

| | Raw Material (parts) | | | | | Viscobyk® | Mark® | Compatibility Observations | | |
|---|---|---|---|---|---|---|---|---|---|---|
| Run | BBP | KF850P | DOSx | S-375 | TXIB | 4040 | 1221 | Clear | Cloudy | Layered |
| 1 | — | 8 | — | 2 | — | — | — | | X | |
| 2 | — | 8 | — | 2 | 1.2 | — | — | X | | |
| 3 | — | 8 | — | 2 | 0.5 | — | — | | X | |
| 4 | — | 8 | — | 2 | 0.8 | — | — | X | | |
| 5 | — | 8 | — | 2 | 0.7 | — | — | X | | |
| 6 | — | 8 | — | 2 | 0.6 | — | — | X | | |
| 7 | — | 8 | — | 2 | 0.8 | 0.4 | — | | X | |
| 8 | — | 8 | — | 2 | 0.8 | 0.4 | 0.8 | | X | |
| 9 | — | 8 | — | 2 | 0.7 | 0.1 | — | | X | |
| 10 | — | 8 | — | 2 | 0.7 | 0.1 | 0.4 | | X | |
| 11 | — | 8 | — | 2 | 1.2 | 0.4 | — | X | | |
| 12 | — | — | — | 2 | — | 0.4 | — | X | | |
| 13 | — | 8 | — | — | — | 0.4 | — | clear-settled | cloudy-initial | |
| 14 | — | 8 | — | 2 | — | 0.4 | 0.8 | | X | X |
| 15 | 8 | — | — | 2 | — | 0.4 | 0.8 | X | | |
| 16 | 8 | — | — | — | — | 0.4 | — | X | | |
| 17 | — | 6.8 | 1.2 | 2 | — | 0.4 | 0.8 | X | | |

Example 6

Test Methodology.

The various methodologies used to evaluate the formulations of Examples 6 and 7 in plastisols are set forth below.

AR2000 Gel/Fusion Method:

The 25 mm ETC steel plate geometry was used in combination with the ETC. The gap was set at 800 μm. The temperature was ramped at a rate of 5° C./min from 40° C. to 200° C. using a controlled strain of 2% and an angular frequency of 1 rad/sec.

AR2000 Shear Method, Steel Plate:

A 20 mm steel plate geometry with Peltier plate and gap set to 200 μm was used. A dime sized amount of plastisol was placed on the Peltier plate. The shear ramp was run at 25° C. from 0 to 1000 $s^{-1}$ over five minutes.

TABLE 8

Wear Layer Formulations (amounts shown in PHR)

| | Controls | | Inventive Examples | |
|---|---|---|---|---|
| Raw Material (amounts in PHR) | Positive (PC) | Negative (NC) | IE-DOSx | IE-PGDB |
| Geon™ 172 (PVC) | 80 | 80 | 80 | 80 |
| Geon™ 217 (PVC homopolymer) | 20 | 20 | 20 | 20 |
| BBP | 40 | — | — | — |
| K-Flex® 850P (X250) | — | 40 | 32 | 12 |
| K-Flex® PG (PGDB) | — | — | — | 28 |
| DOSx | — | — | 8 | — |
| Santicizer® 375 | 10 | 10 | 10 | 10 |

TABLE 8-continued

Wear Layer Formulations (amounts shown in PHR)

| Raw Material | Controls | | Inventive Examples | |
|---|---|---|---|---|
| (amounts in PHR) | Positive (PC) | Negative (NC) | IE-DOSx | IE-PGDB |
| Mark ® 1221 | 4 | 4 | 4 | 4 |
| Viscobyk ® 4040 | 2 | 2 | 2 | 2 |
| Total | 156 | 156 | 156 | 156 |

The viscosity results of these samples are shown in FIG. 1 and in Table 9. Interestingly, although the negative control started out with a much higher viscosity than the positive control, its viscosity remained stable over the one week evaluation period, while the viscosity of the positive control increased dramatically. Both inventive examples demonstrated excellent viscosity stability through seven days, which is a further improvement over the BBP control.

Figure 2:
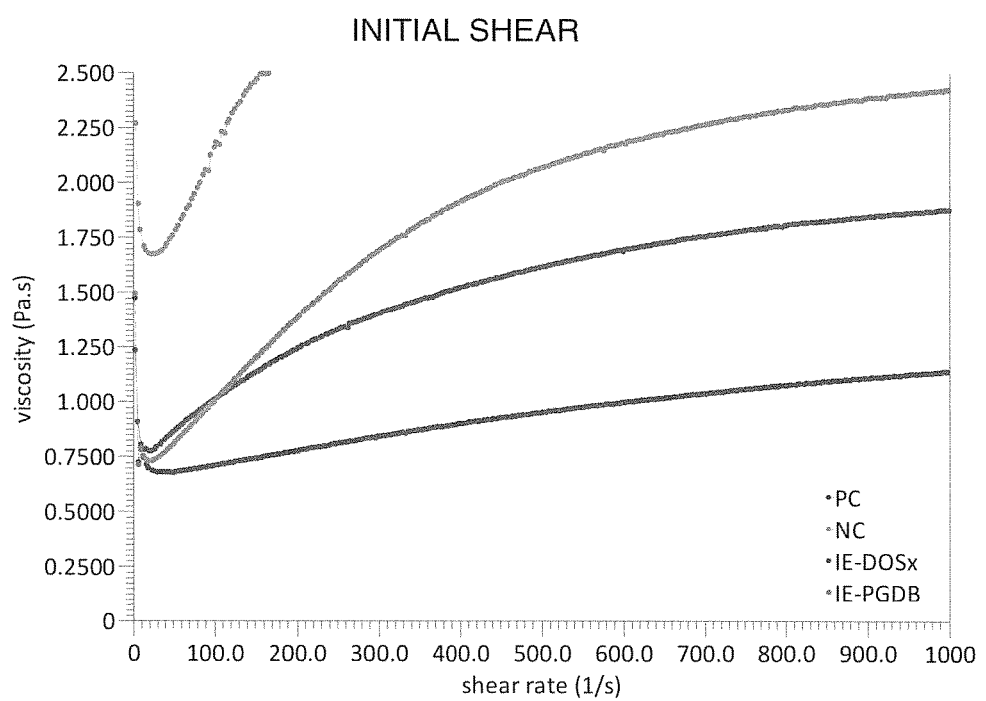
FIG. 2 shows initial shear ramp response for various wear layer formulations.
Figure 3:
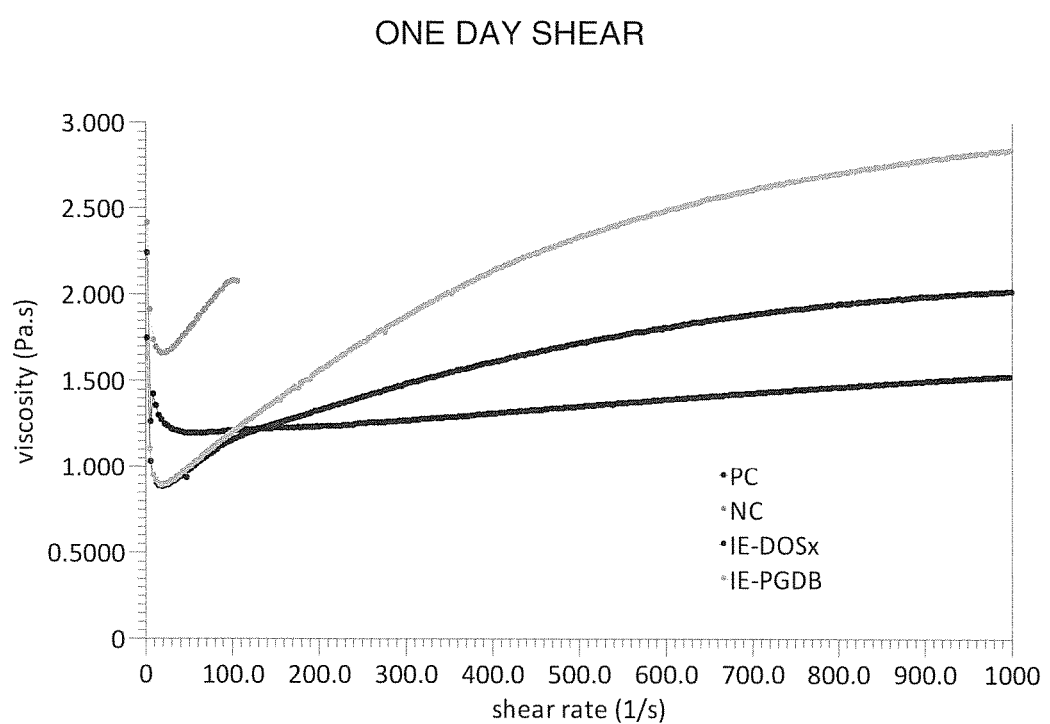
FIG. 3 shows one day shear ramp response for various wear layer formulations.
Figure 4:
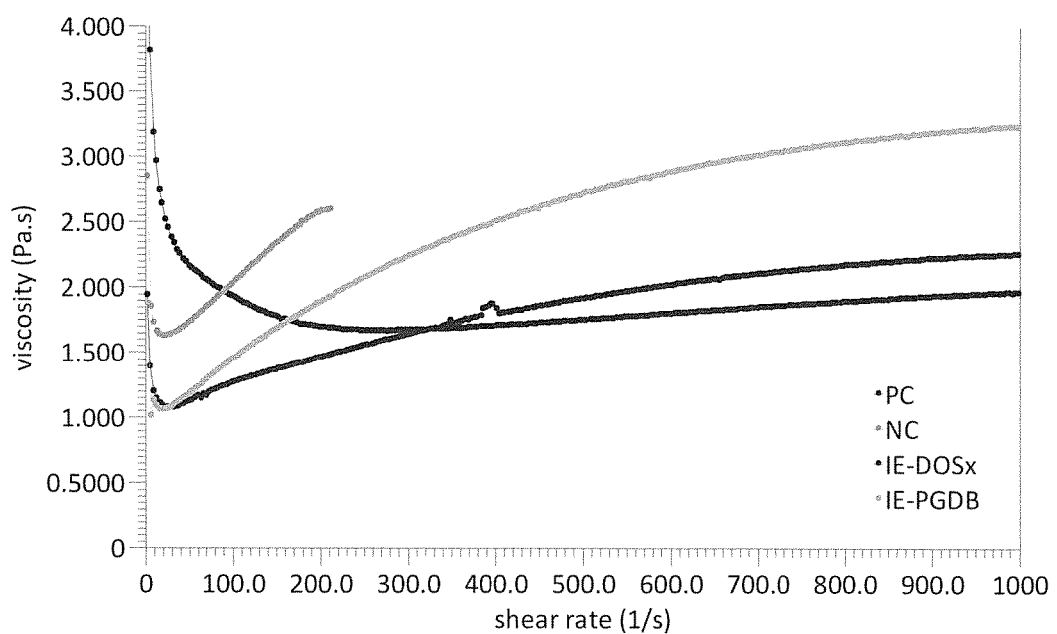
FIG. 4 shows seven day shear ramp response for various wear layer formulations.

The shear results from initial through seven days are shown in FIGS. 2 through 4 for the above inventive examples. The negative control showed poor rheology using the same geometry and gap that worked well for the positive control and other inventive examples.

Figure 5:
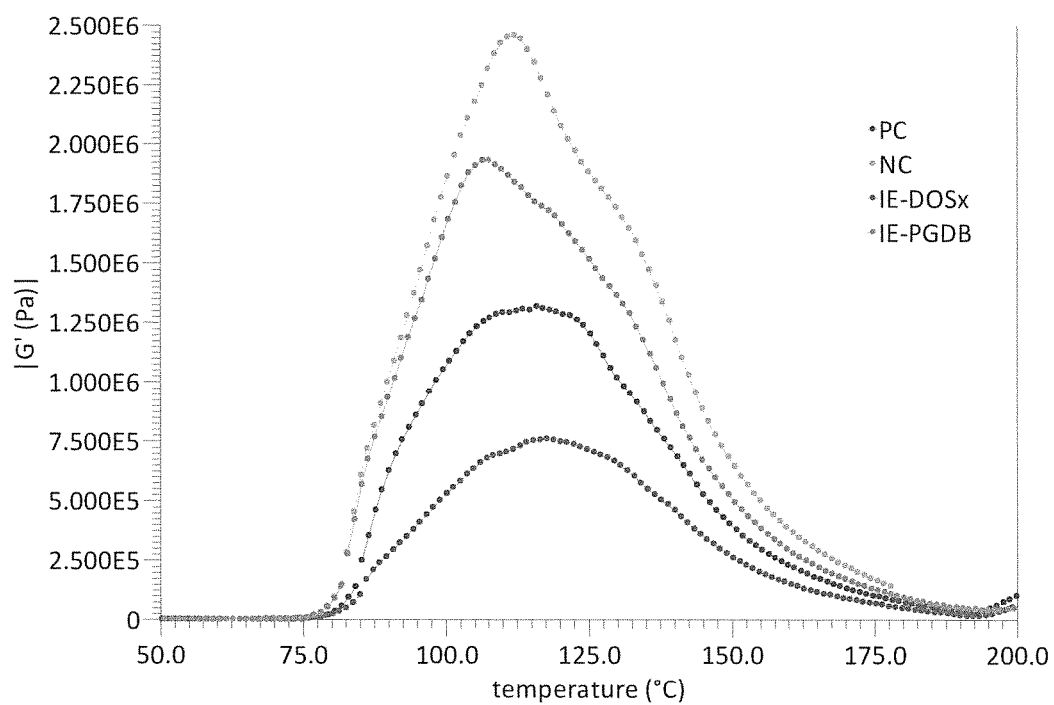
FIG. 5 shows gel/fusion curves for various wear layer formulations.
Figure 6:
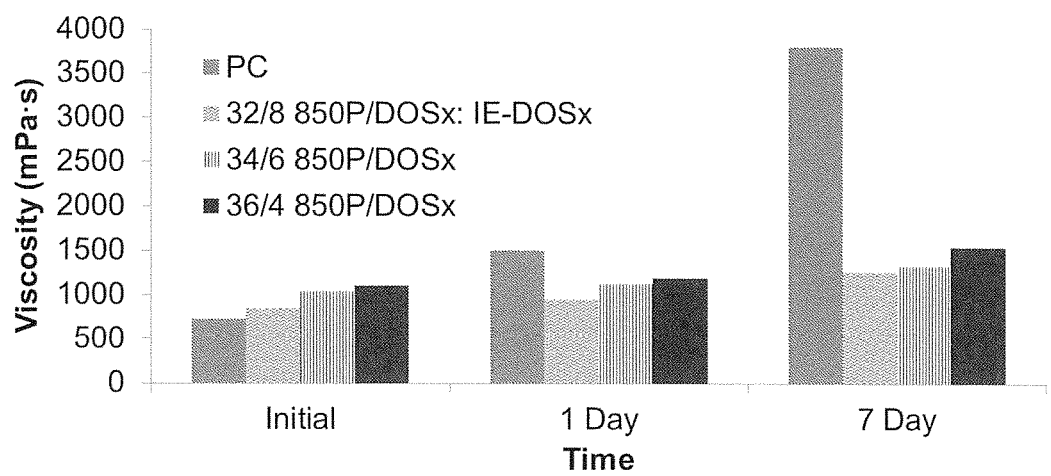
FIG. 6 shows low shear viscosities for various ratios of DOSx to a dibenzoate diblend as compared to a positive control.
Figure 7:
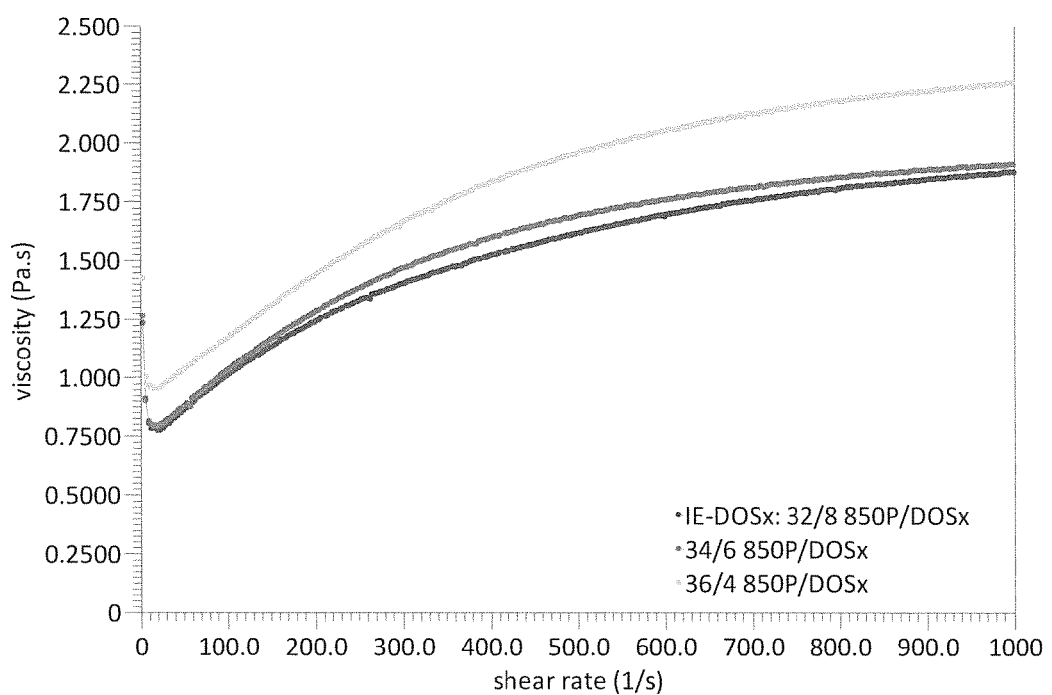
FIG. 7 shows initial shear ramp response for various ratios of DOSx to a dibenzoate diblend.
Figure 8:
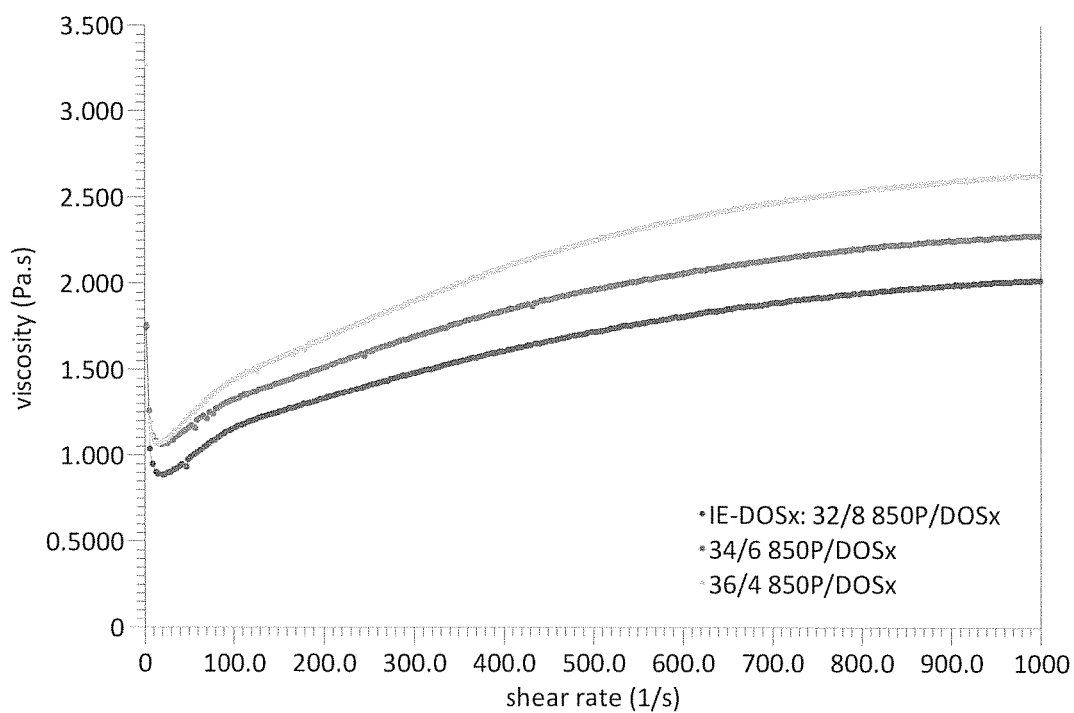
FIG. 8 shows one day shear ramp response for various ratios of DOSx to a dibenzoate diblend.
Figure 9:
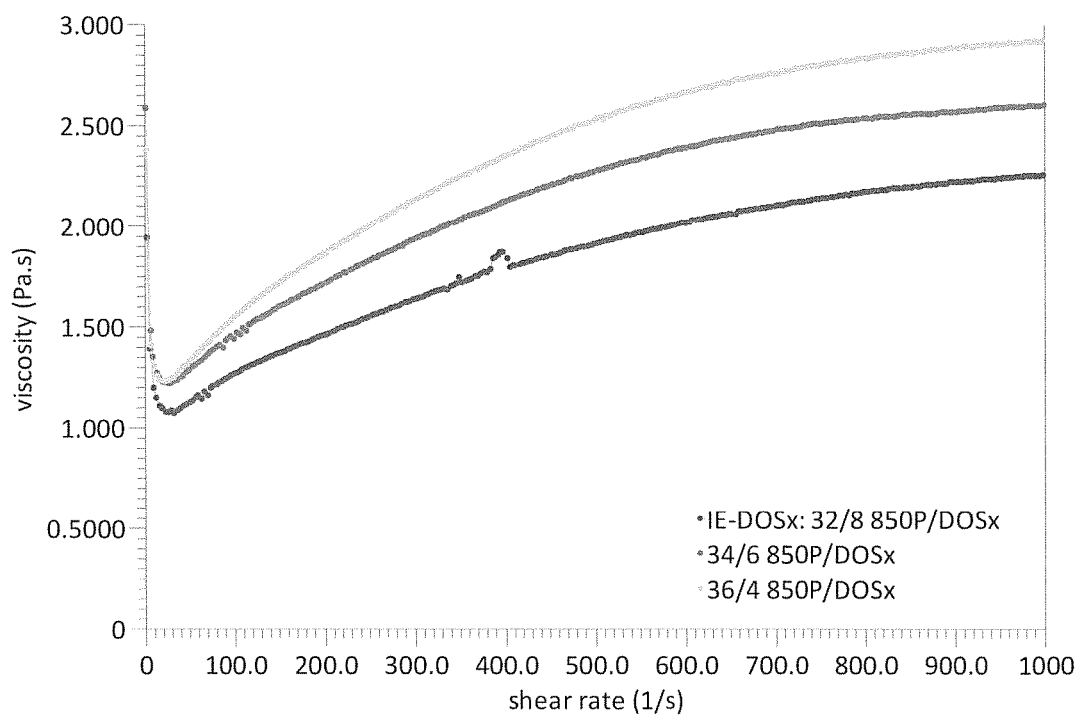
FIG. 9 shows seven day shear ramp response for various ratios of DOSx to a dibenzoate diblend.

Gel/fusion results determined for the inventive blends are shown in FIG. 5. The inventive example using PGDB had an earlier gel onset and peaked with higher gel strength than the positive control or the DOSx inventive example; this is not surprising due to the very high solvating nature of PGDB Example 7

Blending Ratio Experiments.

Figure 10:
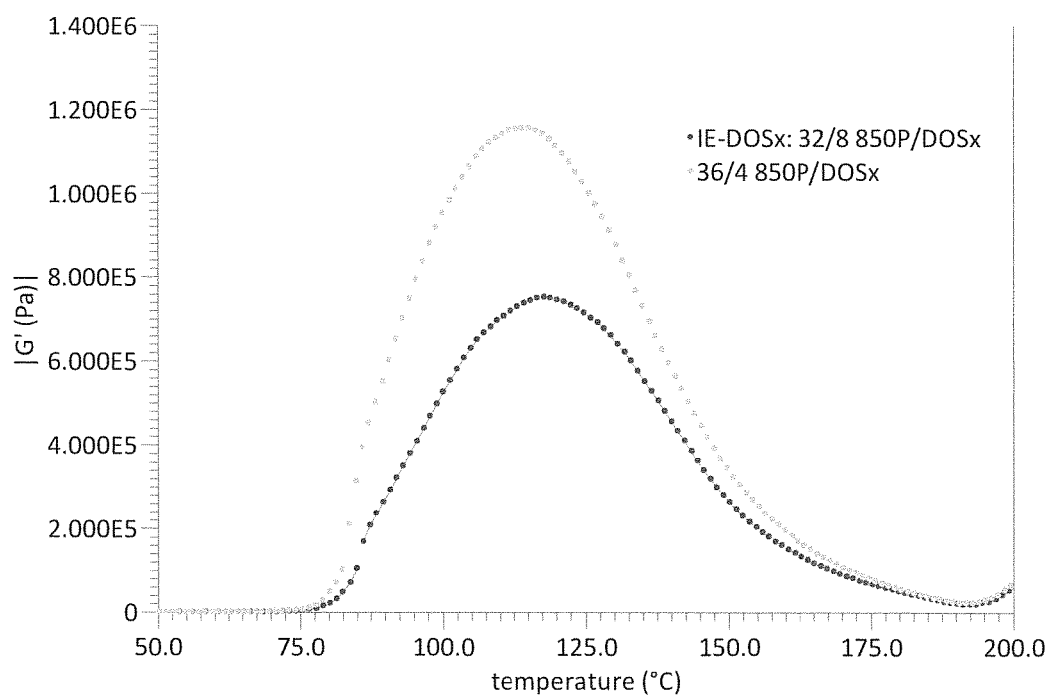
FIG. 10 shows gel/fusion curves for various ratios of DOSx to a dibenzoate diblend.

To further evaluate the proper ratio of K-Flex® 850P (X-250) to DOSx in a wear layer formulation, several blends of this inventive example were prepared and tested. The resultant viscosity data is shown in Table 9, below. The initial, one day and seven day ramp response results are also depicted in FIGS. 6 through 9 and showed an improvement in the rheology/viscosity characteristics as the ratio of DOSx to 850P was pushed in favor of higher amounts of DOSx. As would be expected, the higher ratio of DOSx to 850P resulted in slightly poorer gel/fusion characteristics (shown in FIG. 10).

TABLE 9

| Formulation | Initial | | 1 Day | | 7 Day | |
|---|---|---|---|---|---|---|
| | Viscosity | Temp | Viscosity | Temp | Viscosity | Temp |
| NC -850P | 1815 | 22.9 | 2085 | 22.7 | 2035 | 23.2 |
| PC - BBP Control | 722 | 22.5 | 1496 | 22.6 | 3795 | 23.3 |
| IE-DOSx - 32:8 850P/DOSx | 842 | 22.2 | 944 | 23.4 | 1262 | 23.7 |
| IE-PGDB - 12:28 850P/PGDB | 858 | 23.1 | 1010 | 22.6 | 1200 | 23.2 |
| 34:6 850P/DOSx | 1040 | 23 | 1126 | 23.1 | 1325 | 23.6 |
| 36:4 850P/DOSx | 1105 | 23.1 | 1190 | 22.4 | 1536 | 23.1 |

For the wear layer formulations tested in the above experiments, it was determined that a ratio of 4:1 K-Flex® 850P:DOSx or 3:7 K-Flex® 850P:PGDB is required to obtain a compatible system with low viscosity that is comparable to the BBP control. The inventive examples exhibited improved viscosity stability over the BBP control as reflected by the dramatic increase in viscosity for the BBP control over seven days of testing.

While in accordance with the patent statutes the best mode and preferred embodiment have been set forth, the scope of the invention is not limited thereto, but rather by the scope of the attached claims.

What is claimed is:

1. A plastisol composition comprising:
a) a polymer;
b) an organic solvent as a diluent to reduce viscosity wherein the organic solvent is a mineral spirit, cycloaliphatic or other petroleum distillate, detergent alkylate or isoparaffin; and,
c) a plasticizer blend comprising a dibenzoate plasticizer as the primary plasticizer mixed in combination with a compatibilizing component consisting of dioctyl succinate, 1,2-propylene glycol dibenzoate or 3-phenyl propyl benzoate, present in the plastisol in an amount of about 30 to about 120 phr total plasticizer content, wherein 1,2-propylene glycol dibenzoate is not used as a compatibilizing component when it comprises a part of the primary plasticizer.

2. The plastisol composition of claim 1, where the primary dibenzoate plasticizer is selected from the group consisting of diethylene glycol dibenzoate, dipropylene glycol dibenzoate, 1,2-propylene glycol dibenzoate and mixtures thereof.

3. A method of achieving compatibility between a mixture of a primary dibenzoate plasticizer and an organic solvent in a plastisol, comprising: adding a compatibilizing plasticizer component to the primary dibenzoate plasticizer prior to mixing with the organic solvent, wherein the dibenzoate plasticizer is selected from the group consisting of diethylene glycol dibenzoate, dipropylene glycol dibenzoate, 1,2-propylene glycol dibenzoate and mixtures thereof, and wherein the compatibilizing plasticizer component is dioctyl succinate, 3-phenyl propyl benzoate or 1,2-propylene glycol dibenzoate or mixtures thereof, provided that 1,2-propylene glycol dibenzoate is not used as a compatibilizing component when it comprises a part of the primary plasticizer,
wherein the compatibilizing plasticizer component and primary dibenzoate plasticizer, combined, are present in the plastisol in an amount of about 30 to about 120 phr total plasticizer content, and
wherein the organic solvent is a mineral spirit, cycloaliphatic or other petroleum distillate, detergent alkylate or isoparaffin.

4. A method of achieving compatibility between a mixture of a primary dibenzoate plasticizer and an organic solvent in a plastisol, comprising: adding a compatibilizing plasticizer component to the primary dibenzoate plasticizer/organic solvent mixture, wherein the dibenzoate plasticizer is selected from the group consisting of diethylene glycol dibenzoate, dipropylene glycol dibenzoate, 1,2-propylene glycol dibenzoate and mixtures thereof, and wherein the compatibilizing plasticizer component is dioctyl succinate, 3-phenyl propyl benzoate, 1,2-propylene glycol dibenzoate or mixtures thereof, provided that 1,2-propylene glycol dibenzoate is not used as a compatibilizing component when it comprises a part of the primary plasticizer,
wherein the compatibilizing plasticizer component and primary dibenzoate plasticizer, combined, are present in the plastisol in an amount of about 30 to about 120 phr total plasticizer content, and
wherein the organic solvent is a mineral spirit, cycloaliphatic or other petroleum distillate, detergent alkylate or isoparaffin.

5. A method for preparing a plastisol having low viscosity comprising:

adding a plasticizer blend to an organic solvent and dispersing a polymer therein, wherein the plasticizer blend consists essentially of:

a) a dibenzoate ester plasticizer as a primary plasticizer selected from the group consisting of diethylene glycol dibenzoate, dipropylene glycol dibenzoate, or 1,2-propylene glycol dibenzoate, and mixtures thereof; and b) a compatibilizing plasticizer component selected from the group consisting of dioctyl succinate, 3-phenyl propyl benzoate, 1,2-propylene glycol dibenzoate, and mixtures thereof, provided that 1,2-propylene glycol dibenzoate is not used as a compatibilizing plasticizer component when it comprises a part of the primary plasticizer, wherein the plasticizer blend is present in the plastisol in an amount of about 30 to about 120 phr total plasticizer content, and wherein the organic solvent is a mineral spirit, cycloaliphatic or other petroleum distillate, detergent alkylate or isoparaffin.

6. A plasticizer blend comprising:

a) a dibenzoate plasticizer diblend comprising a 4:1 ratio of diethylene glycol dibenzoate to dipropylene glycol dibenzoate, as a primary plasticizer; and b) a compatibilizing plasticizer component that is dioctyl succinate, wherein the ratio of the diblend to the dioctyl succinate is 4:1.

7. A plasticizer blend comprising:

a) a dibenzoate plasticizer diblend comprising a 4:1 ratio of diethylene glycol dibenzoate to dipropylene glycol dibenzoate, as a primary plasticizer; and b) a compatibilizing plasticizer component that is 1,2-propylene glycol dibenzoate, wherein the ratio of the diblend to the 1,2-propylene glycol dibenzoate is 3:7.

* * * * *